（12） United States Patent
Gu

(10) Patent No.: US 10,922,843 B2
(45) Date of Patent: Feb. 16, 2021

(54) CALIBRATION METHOD AND CALIBRATION DEVICE OF VEHICLE-MOUNTED CAMERA, VEHICLE AND STORAGE MEDIUM

(71) Applicant: BOE TECHNOLOGY GROUP CO., LTD., Beijing (CN)

(72) Inventor: Yu Gu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/413,036

(22) Filed: May 15, 2019

(65) Prior Publication Data

US 2020/0105017 A1 Apr. 2, 2020

(30) Foreign Application Priority Data

Sep. 30, 2018 (CN) .......................... 2018 1 1156817

(51) Int. Cl.
*G06T 7/80* (2017.01)
*G06T 7/70* (2017.01)
(Continued)

(52) U.S. Cl.
CPC ............ *G06T 7/80* (2017.01); *G06K 9/00798* (2013.01); *G06K 9/3233* (2013.01); *G06K 9/38* (2013.01);
(Continued)

(58) Field of Classification Search
CPC ... G06T 7/80; G06T 7/70; G06T 2207/30256; H04N 5/23299; G06K 9/00798;
(Continued)

(56) References Cited

U.S. PATENT DOCUMENTS 6,552,742 B1 * 4/2003 Seta .......................... G06T 7/85
348/42
6,594,600 B1 * 7/2003 Arnoul ............... G01B 11/2755
382/154
(Continued)

FOREIGN PATENT DOCUMENTS

CN 105447892 A 3/2016
CN 105460009 A 4/2016
(Continued)

OTHER PUBLICATIONS

Li et al., "Application of Cubic Spline in Navigation for Aircraft Landing", J. Huazhong University of Science & Technology (Nature Science Edition), China Academic Journal Electronic Publishing House, vol. 34, No. 6, Jun. 2006, pp. 22-24 with English translation (5 pages).
(Continued)

*Primary Examiner* — Brian P Yenke
(74) *Attorney, Agent, or Firm* — Collard & Roe, P.C.

(57) ABSTRACT

A calibration method and a calibration device of a vehicle-mounted camera, a vehicle and a storage medium are provided. The calibration method includes: obtaining an original image including a plurality of first lane lines and captured by the vehicle-mounted camera; determining a region of interest (ROI) including the plurality of first lane lines in the original image; adjusting a pitch angle of the vehicle-mounted camera by detecting a plurality of second lane lines in a first inverse perspective mapping (IPM) image corresponding to the ROI, the second lane lines corresponding to the first lane lines; and adjusting a yaw angle of the vehicle-mounted camera by detecting an IPM binary image of a second IPM image corresponding to the ROI.

12 Claims, 9 Drawing Sheets

(51) Int. Cl.
  *H04N 5/232* (2006.01)
  *G06K 9/00* (2006.01)
  *G06K 9/32* (2006.01)
  *G06K 9/38* (2006.01)
  *G06K 9/46* (2006.01)
  *G06K 9/62* (2006.01)
(52) U.S. Cl.
  CPC ......... *G06K 9/4609* (2013.01); *G06K 9/6232* (2013.01); *G06T 7/70* (2017.01); *H04N 5/23299* (2018.08); *G06T 2207/30256* (2013.01)
(58) Field of Classification Search
  CPC ...... G06K 9/3233; G06K 9/38; G06K 9/4609; G06K 9/6232
  See application file for complete search history.

(56) References Cited

U.S. PATENT DOCUMENTS

| | | | |
|---|---|---|---|
| 9,883,145 B2* | 1/2018 | Kawai | H04N 7/18 |
| 10,373,338 B2* | 8/2019 | Inoue | G06T 7/85 |
| 10,397,479 B2* | 8/2019 | Purkait | H04N 5/3532 |
| 10,453,186 B2* | 10/2019 | Byeon | H04N 5/23229 |
| 10,640,041 B2* | 5/2020 | Gupta | H04N 17/002 |
| 2004/0183905 A1* | 9/2004 | Comaniciu | G06K 9/3241 |
| | | | 348/148 |
| 2005/0149240 A1 | 7/2005 | Tseng et al. | |
| 2008/0007619 A1* | 1/2008 | Shima | G06T 7/80 |
| | | | 348/118 |
| 2008/0031514 A1* | 2/2008 | Kakinami | G06T 7/80 |
| | | | 382/154 |
| 2008/0144924 A1* | 6/2008 | Hoffmann | G06T 7/85 |
| | | | 382/154 |
| 2009/0021609 A1* | 1/2009 | Luo | B60Q 9/005 |
| | | | 348/241 |
| 2010/0079590 A1* | 4/2010 | Kuehnle | G06K 9/00798 |
| | | | 348/118 |
| 2012/0314073 A1* | 12/2012 | Shimoda | G06T 7/80 |
| | | | 348/148 |
| 2015/0279017 A1* | 10/2015 | Tamura | G06K 9/00791 |
| | | | 382/103 |
| 2016/0037032 A1* | 2/2016 | Iwama | G06T 7/73 |
| | | | 348/148 |
| 2016/0379064 A1* | 12/2016 | van Beek | G06K 9/00798 |
| | | | 382/104 |
| 2017/0136948 A1* | 5/2017 | Sypitkowski | G06K 9/00791 |
| 2017/0169300 A1* | 6/2017 | Heisele | G06K 9/00208 |
| 2018/0165833 A1* | 6/2018 | Inoue | G01C 25/00 |
| 2018/0322648 A1* | 11/2018 | Lu | G06T 7/85 |
| 2018/0365858 A1* | 12/2018 | Kim | H04N 7/181 |
| 2018/0365859 A1* | 12/2018 | Oba | G06T 7/80 |
| 2019/0095722 A1* | 3/2019 | Kang | G06K 9/00798 |
| 2020/0026930 A1* | 1/2020 | Gu | G06K 9/46 |
| 2020/0074190 A1* | 3/2020 | Khakharia | G06N 3/04 |

FOREIGN PATENT DOCUMENTS

| | | |
|---|---|---|
| CN | 106558080 A | 4/2017 |
| CN | 108470142 A | 8/2018 |
| CN | 110196062 A | 9/2019 |

OTHER PUBLICATIONS

"Robust Inverse Perspective Transformation Based on Vanishing Point," Chinese Master's Thesis Full-text Database Information Science and Technology, www.cnki.net, Issue 6, vol. 1, 2016, pp. 8-19 with English translation (28 pages).
Chinese Office Action in Chinese Application No. 201811156817.2, dated Apr. 21, 2020 with English translation.

* cited by examiner

IPM Binary Image

CALIBRATION METHOD AND CALIBRATION DEVICE OF VEHICLE-MOUNTED CAMERA, VEHICLE AND STORAGE MEDIUM

This application claims priority to Chinese Patent Application No. 201811156817.2, filed on Sep. 30, 2018, which is hereby entirely incorporated by reference as a part of the present application.

TECHNICAL FIELD

Embodiments of the present disclosure relate to a calibration method and a calibration device of a vehicle-mounted camera, a vehicle and a storage medium.

BACKGROUND

An advanced driver assistance system (ADAS) is usually mounted to a front windshield of a vehicle and monitors an abnormal situation on a road ahead in real time through a camera, such as whether it is too close to a front car, whether the driver changes lanes unconsciously without turning on the turn signal, whether it is too close to a pedestrian, etc. In case of detecting the abnormal situation, the ADAS may send a warning message to the driver to alert the driver of the abnormal situation.

SUMMARY

At least one embodiment of the present disclosure provides a calibration method of a vehicle-mounted camera, which comprises: obtaining an original image comprising a plurality of first lane lines and captured by the vehicle-mounted camera; determining in the original image a region of interest (ROI) comprising the plurality of first lane lines; adjusting a pitch angle of the vehicle-mounted camera by detecting a plurality of second lane lines in a first inverse perspective mapping (IPM) image corresponding to the ROI, the plurality of second lane lines corresponding to the plurality of first lane lines; and adjusting a yaw angle of the vehicle-mounted camera by detecting an IPM binary image of a second IPM image corresponding to the ROI.

In some examples, the adjusting the pitch angle of the vehicle-mounted camera by detecting the plurality of second lane lines in the first IPM image comprises: adjusting the pitch angle of the vehicle-mounted camera by detecting a relationship between the plurality of second lane lines in the first IPM image, to obtain a final first IPM image wherein a plurality of second lane lines in the final first IPM image are parallel to each other and correspond to the plurality of first lane lines.

In some examples, the adjusting the pitch angle of the vehicle-mounted camera by detecting the relationship between the plurality of second lane lines in the first IPM image to obtain the final first IPM image comprises: executing a first set operation, wherein the first set operation comprises: determining an intermediate first IPM image based on the current pitch angle and an initial yaw angle of the vehicle-mounted camera, and detecting whether a plurality of second lane lines in the intermediate first IPM image are parallel to each other, wherein the plurality of second lane lines in the intermediate first IPM image correspond to the plurality of first lane lines; adjusting the current pitch angle and re-executing the first set operation, in a case where the plurality of second lane lines in the intermediate first IPM image are not parallel to each other, until the plurality of second lane lines in the intermediate first IPM image are parallel to each other and the final first IPM image is obtained.

In some examples, the detecting whether the plurality of second lane lines in the intermediate first IPM image are parallel to each other comprises: detecting whether angles of the plurality of second lane lines in the intermediate first IPM image with respect to a same reference line in a same direction are identical; determining that the plurality of second lane lines in the intermediate first IPM image are parallel to each other in a case where the angles of the plurality of second lane lines in the intermediate first IPM image with respect to the same reference line in the same direction are identical; and determining that the plurality of second lane lines in the intermediate first IPM image are not parallel to each other in a case where angles of any two of the plurality of second lane lines in the intermediate first IPM image with respect to the same reference line in the same direction are not identical.

In some examples, the detecting whether the plurality of second lane lines in the intermediate first IPM image are parallel to each other further comprises: determining the plurality of second lane lines in the intermediate first IPM image, and further the determining the plurality of second lane lines in the intermediate first IPM image comprises: obtaining a dark-light-dark (DLD) feature image by extracting a DLD feature from the intermediate IPM image; obtaining a DLD binary image by performing a binarization process on the DLD feature image; and determining the plurality of second lane lines in the intermediate IPM image by performing straight-line detection on the DLD binary image.

In some examples, the obtaining the DLD feature image by extracting the DLD feature from the intermediate first IPM image comprises: extracting a lane line feature from the intermediate first IPM image by performing DLD filtering on the intermediate first IPM image, wherein the lane line feature is expressed as: DLD (u, v)=max (min (src(u, v)−src(u−2, v), src(u, v)−src(u+2, v)), 0), where src(u, v) indicates a pixel value of a coordinate (u, v) in the intermediate first IPM image; and obtaining the DLD feature image based on the lane line feature.

In some examples, the adjusting the current pitch angle in the case where the plurality of second lane lines in the intermediate first IPM image are not parallel to each other comprises: selecting any two nonparallel second lane lines from the plurality of second lane lines in the intermediate first IPM image and detecting a position of an intersection point of the two nonparallel second lane lines or of extension lines of the two nonparallel second lane lines; reducing the current pitch angle by a first preset step in a case where the intersection point is in a start direction of the two nonparallel second lane lines; and increasing the current pitch angle by a second preset step in a case where the intersection point is in an end direction of the two nonparallel second lane lines.

In some examples, the adjusting the yaw angle of the vehicle-mounted camera by detecting the IPM binary image of the second IPM image comprises: adjusting the yaw angle of the vehicle-mounted camera to obtain a final IPM binary image of a final second IPM image, wherein a boundary line between a first pixel value region and a second pixel value region in the final IPM binary image is two straight lines, and the first pixel value region in the final IPM binary image corresponds to the ROI.

In some examples, the adjusting the yaw angle of the vehicle-mounted camera to obtain the final IPM binary image of the final second IPM image comprises: executing a second set operation, wherein the second set operation comprises: determining an intermediate second IPM image based on the adjusted pitch angle and the current yaw angle of the vehicle-mounted camera, obtaining an intermediate IPM binary image by performing a binarization process on the intermediate second IPM image, and detecting whether a boundary line between a first pixel value region and a second pixel value region in the intermediate IPM binary image is two straight lines, wherein the first pixel value region in the intermediate IPM binary image corresponds to the ROI; and adjusting the current yaw angle and re-executing the second set operation in a case where the boundary line between the first pixel value region and the second pixel value region in the intermediate IPM binary image is not the two straight lines, until the boundary line between the first pixel value region and the second pixel value region in the intermediate IPM binary image is the two straight lines and the final IPM binary image is obtained.

In some examples, the adjusting the current yaw angle and re-executing the second set operation in a case where the boundary line between the first pixel value region and the second pixel value region in the intermediate IPM binary image is not the two straight lines comprises: detecting positions of straight lines in the intermediate IPM binary image, in a case where the boundary line between the first pixel value region and the second pixel value region in the intermediate IPM binary image comprises more than two straight lines; reducing the current yaw angle by a third preset step in a case where any two of the more than two straight lines pass through a top left vertex of the intermediate IPM binary image; and increasing the current yaw angle by a fourth preset step in a case where any two of the more than two straight lines pass through a top right vertex of the intermediate IPM binary image.

At least one embodiment of the present disclosure further provides a calibration device of a vehicle-mounted camera, which comprises: an image obtaining unit, configured to obtain an original image comprising a plurality of first lane lines and captured by the vehicle-mounted camera; a region of interest (ROI) determining unit, configured to determine a region of interest (ROI) comprising the plurality of first lane lines in the original image; a pitch angle adjusting unit, configured to adjust a pitch angle of the vehicle-mounted camera by detecting a plurality of second lane lines in a first inverse perspective mapping (IPM) image corresponding to the ROI, the plurality of second lane lines corresponding to the plurality of first lane lines; and a yaw angle adjusting unit, configured to adjust a yaw angle of the vehicle-mounted camera by detecting an IPM binary image of a second IPM image corresponding to the ROI.

In some examples, the pitch angle adjusting unit is configured to adjust the pitch angle of the vehicle-mounted camera by detecting a relationship between the plurality of second lane lines in the first IPM image, to obtain a final first IPM image, and the plurality of second lane lines in the final first IMP image are parallel to each other.

In some examples, the pitch angle adjusting unit is configured to execute a first set operation, wherein the first set operation comprises: determining an intermediate first IPM image based on a current pitch angle and an initial yaw angle of the vehicle-mounted camera; and detecting whether the plurality of second lane lines in the intermediate first IPM image are parallel to each other, the plurality of second lane lines in the intermediate first IPM image corresponding to the plurality of first lane lines; the pitch angle adjusting unit is further configured to adjust the current pitch angle and re-execute the first set operation in a case where any two of the plurality of second lane lines in the intermediate first IPM image are not parallel to each other, until the plurality of second lane lines in the intermediate first IPM image are parallel to each other and the final first IMP image is obtained.

In some examples, the detecting whether the plurality of second lane lines in the first IPM image are parallel to each other comprises: detecting whether angles of the plurality of second lane lines in the intermediate first IPM image with respect to a same reference line in a same direction are identical; determining that the plurality of second lane lines are parallel to each other in a case where the angles of the plurality of second lane lines in the intermediate first IPM image with respect to the same reference line in the same direction are identical; and determining that the plurality of second lane lines are not parallel to each other in a case where angles of any two of the plurality of second lane lines in the intermediate first IPM image with respect to the same reference line in the same direction are not identical.

In some examples, the yaw angle adjusting unit is configured to adjust the yaw angle of the vehicle-mounted camera to obtain the final IPM binary image of the final second IPM image, wherein a boundary line of a first pixel value region and a second pixel value region in the final IPM binary image is two straight lines, and the first pixel value region in the final IPM binary image corresponds to the ROI.

In some examples, the yaw angle adjusting unit is configured to execute a second set operation, wherein the second set operation comprises: determining an intermediate second IPM image based on the adjusted pitch angle and a current yaw angle of the vehicle-mounted camera, obtaining an intermediate IPM binary image by performing a binarization process on the intermediate second IPM image, and detecting whether a boundary line between a first pixel value region and a second pixel value region in the intermediate IPM binary image is the two straight lines, the first pixel value region in the intermediate IPM binary image corresponding to the ROI; the yaw angle adjusting unit is further configured to adjust the current yaw angle and re-execute the second set operation in a case where the boundary line between the first pixel value region and the second pixel value region in the intermediate IPM binary image is not the two straight lines, until the boundary line between the first pixel value region and the second pixel value region in the intermediate IPM binary image is the two straight lines and the final IPM binary image is obtained.

At least one embodiment of the present disclosure further provides a vehicle comprising a vehicle-mounted camera and the above mentioned calibration device, and the calibration device is configured for calibrating the vehicle-mounted camera.

At least one embodiment of the present disclosure further provides a storage medium storing a computer-readable instruction non-transitorily, which when executed by a computer, causes a following method to be executed: obtaining an original image comprising a plurality of first lane lines captured by the vehicle-mounted camera; determining a region of interest (ROI) comprising the plurality of first lane lines in the original image; detecting a plurality of second lane lines in a first inverse perspective mapping (IPM) image corresponding to the ROI to adjust a pitch angle of the vehicle-mounted camera, the second lane lines corresponding to the plurality of first lane lines; and detecting an IPM binary image of a second IPM image corresponding to the ROI to adjust a yaw angle of the vehicle-mounted camera.

BRIEF DESCRIPTION OF THE DRAWINGS

In order to clearly illustrate the technical solutions of the embodiments of the disclosure, the drawings of the embodi

DETAILED DESCRIPTION

Figure 1:
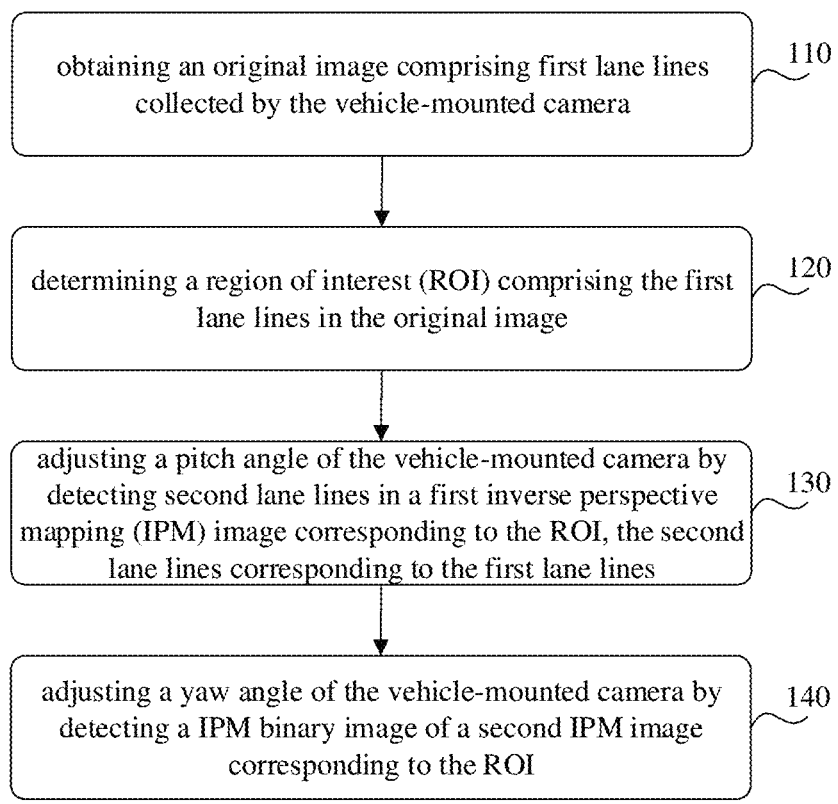
- FIG. 1 is a schematic flowchart of a calibration method of a vehicle-mounted camera provided by some embodiments of the present disclosure.

The technical solutions of the embodiments of the present disclosure will be described in a clearly and fully understandable way in connection with the drawings. With reference to the nonrestrictive exemplary embodiments shown in the drawings and detailed in the following description, the exemplary embodiments of the present disclosure and their various features and advantageous details are more fully explained. It should be noted that the features shown in the figures are not necessarily drawn to scale. The disclosure omits the descriptions of known materials, components and process techniques so as not to cloud the exemplary embodiments of the present disclosure. The examples are given only to facilitate an understanding of the implementation of the exemplary embodiments of the present disclosure, and to enable those skilled in the art to practice the exemplary embodiments. Therefore, the examples are not to be construed as limitative of the scope of the embodiments of the present disclosure.

Unless otherwise defined, all the technical and scientific terms used in the present disclosure have the meanings as commonly understood by one of ordinary skill in the art to which the present disclosure belongs. The terms "first," "second," etc., which are used in the present disclosure, are not intended to indicate any sequence, amount or importance, but distinguish various components. In addition, in the various embodiments of the present disclosure, the same or similar reference numerals denote the same or similar components.

It should be noted features in one embodiment or in different embodiments of the present disclosure can be combined in case of no conflict.

A camera in an ADAS system requires to be calibrated after the ADAS system is mounted, and calibration parameters of the camera are required by the calibration. Intrinsic parameters may be obtained through some calibrations software (such as Zhangzhengyou calibration Method and the like); however, extrinsic parameters (including mounting angles (such as a pitch angle, a yaw angle and a roll angle) and the mounting height of the camera) are different for each device. Thus, it is important for a user to obtain the extrinsic parameters of the camera quickly and conveniently.

A calibration method configured for the ADAS system is implemented by a professional installation personnel to calibrate the camera using calibration tools such as a calibration board. This method is complicated and increases human costs. Another calibration method requires a user to adjust manually an installation position of the camera to accomplish the calibration. For example, an image taken by the camera is displayed in a display device (or a matching cellphone application) and a cross is marked in the image, the user manually adjusts an angle of the camera using tools such as a wrench until an end point coincides with the cross and the calibration is finished. This method is not convenient and the user experience is poor.

Embodiments of the present disclosure provide a calibration method, which may accomplish an automatic calibration of a vehicle-mounted camera as long as the ADAS system is mounted to the vehicle. The process is simple and convenient, the stability is high and the user experience is effectively improved.

It should be noted that a pitch angle, a yaw angle and a roll angle of a camera is determined according to a relationship between a camera coordinate system and a ground coordinate system. The ground coordinate system conforms to the right-hand rule, any point in the ground may be taken as an origin Og, an Xg axis points to a front direction of the vehicle, a Zg axis points to a direction perpendicular to the ground and directing to the earth's core, a Yg axis points to a direction perpendicular to the Xg direction and the Zg direction, and the OgXgYg plane is taken as a ground plane (a horizontal plane). The camera coordinate system also conforms to the right-hand rule, an optical center of the camera is taken as an origin, an optical axis directing to a screen of the camera is taken as an X axis, a Z axis is perpendicular to the optical axis and directs downwards, and a Y axis is perpendicular to an OXY plane.

Based on above relationship between the ground coordinate system and the camera coordinate system, a pitch angle of the camera indicates an included angle between the optical axis of the camera and the ground plane (the horizontal plane), a yaw angle indicates an included angle between an orthographic projection of the optical axis of the camera on the horizontal plane and the Xg axis, and a roll angle indicates an included angle between the Z axis and a vertical plane passing through the X axis of the camera.

Based on a design of an ADAS system, generally, only two parameters of the camera require to be calibrated: the pitch angle and the yaw angle. The roll angle defaults to 0.

The mounting height of the camera may be determined according to practical situations in advance, a default value of the mounting height is generally but not limited to 1300 mm.

During the calibration process, the pitch angle and the yaw angle each have an initial value. In case of a first calibration process, the initial value may be determined empirically and would not cause a large deviation from a final value. If it is not a first calibration process, the initial value may be a value determined by the last calibration process.

Embodiments of the present disclosure are described below in detail with reference to the drawings.

Embodiments of the present disclosure provide a calibration method of a vehicle-mounted camera. Referring to FIG. 1, which illustrates a schematic flowchart of the calibration method provided by some embodiments of the present disclosure, the method comprises following steps 110-140.

Step 110: obtaining an original image comprising a plurality of first lane lines and captured by the vehicle-mounted camera.

Figure 3A:
FIG. 3A is a schematic diagram of an original image of a road obtained by a vehicle-mounted camera.

For example, the vehicle-mounted camera is mounted to a front windshield of a vehicle and captures an original image of a road ahead of the vehicle, and the original image comprises a plurality of first lane lines. For example, the plurality of first lane lines comprises at least two lane lines. FIG. 3A illustrates an example of the original image which comprises three first lane lines K1, K2 and K3.

Step 120: determining in the original image a region of interest (ROI) comprising the plurality of first lane lines.

By means of selecting the ROI in the original image, interference information may be effectively eliminated, subsequent processing time may be decreased and image processing accuracy may be improved, e. The ROI may be defined by a rectangle, a circle, an oval or an irregular polygon. For example, because the lane lines are generally distributed in a bottom half of the original image, a middle portion of a bottom half or a bottom third of the original image may be selected as the ROI empirically after obtaining the original image. As illustrated in FIG. 3A, a region comprising the three first lane lines defined by a rectangular frame is selected as the ROI.

Step 130: adjusting a pitch angle of the vehicle-mounted camera by detecting a plurality of second lane lines in a first inverse perspective mapping (IPM) image corresponding to the ROI, the plurality of second lane lines corresponding to the plurality of first lane lines.

Figure 3B:
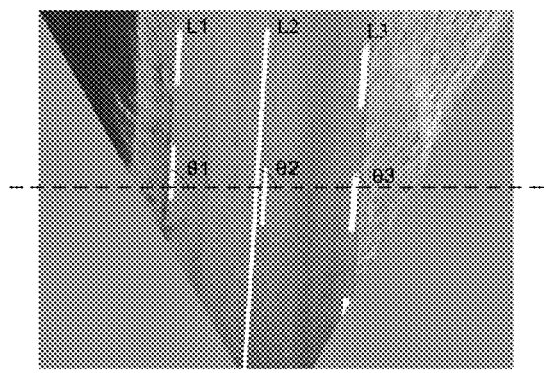
FIG. 3B is a schematic diagram of a first inverse perspective mapping (IPM) image corresponding to a region of interest (ROI) in the original image.

For example, the first IPM image corresponding to the ROI is obtained by performing an IPM conversion on the ROI image, the first IPM image comprises a plurality of second lane lines which correspond to the plurality of first lane lines and are obtained by performing the IPM conversion on the first lane lines. FIG. 3B illustrates an exemplary diagram of the first IPM image corresponding to the ROI. As illustrated in FIG. 3B, the first IPM image comprises second lane lines L1, L2 and L3, corresponding to the first lane lines.

Figure 2:
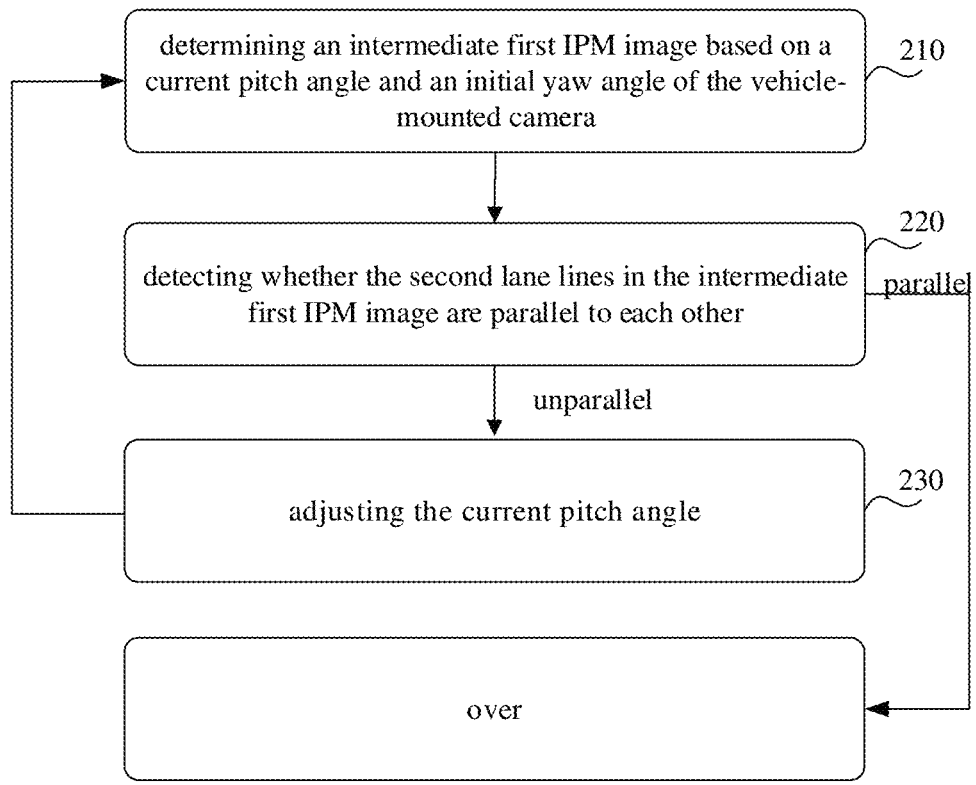
FIG. 2 is a schematic flowchart of an adjustment method of a pitch angle of a vehicle-mounted camera provided by some embodiments of the present disclosure.

In an example, a pitch angle of the vehicle-mounted camera may be adjusted by detecting a relationship between the second lane lines in the first IPM image, to obtain a final first IPM image, in which second lane lines corresponding to the first lane lines are parallel to each other. For example, adjusting the pitch angle of the vehicle-mounted camera by detecting the relationship between the second lane lines in the first IPM image to obtain the final first IPM image comprises executing a first set operation, and the first set operation may comprises following steps 210-220, as illustrated in FIG. 2. The first IPM image may indicate a first IPM occurring during a whole process of adjusting the pitch angle, for example, may be the final first IPM image and an intermediate first IPM image before the final first IPM image.

Step 210: determining, based on a current pitch angle and an initial yaw angle of the vehicle-mounted camera, an intermediate first IPM image corresponding to the ROI.

For example, in a case where the first set operation is executed for the first time, the current pitch angle of the camera is an initial pitch angle of the camera; in a case where it is not the first time the first set operation is executed, the current pitch angle of the camera is an adjusted pitch angle after the last first set operation is executed.

For example, the first IPM image may be obtained by performing an IPM conversion on the ROI based on the current pitch angle and the initial yaw angle of the camera and a conversion relationship between a pixel coordinate system and a world coordinate system.

For example, a conversion relationship between a pixel coordinate of a point in the original image and a world coordinate of a point in the world coordinate system taking the vehicle-mounted camera as an origin is as follows:

$$Z_c \begin{bmatrix} u \\ v \\ 1 \end{bmatrix} = \begin{bmatrix} \frac{1}{dx} & 0 & u_0 \\ 0 & \frac{1}{dy} & v_0 \\ 0 & 0 & 1 \end{bmatrix} \begin{bmatrix} f & 0 & 0 & 0 \\ 0 & f & 0 & 0 \\ 0 & 0 & 1 & 0 \end{bmatrix} \begin{bmatrix} R & t \\ 0^T & 1 \end{bmatrix} \begin{bmatrix} X \\ Y \\ Z \\ 1 \end{bmatrix} =$$

$$\begin{bmatrix} \frac{f}{dx} & 0 & u_0 & 0 \\ 0 & \frac{f}{dy} & v_0 & 0 \\ 0 & 0 & 1 & 0 \end{bmatrix} \begin{bmatrix} R & T \\ 0^T & 1 \end{bmatrix} \begin{bmatrix} X \\ Y \\ Z \\ 1 \end{bmatrix}$$

where f/dx, f/dy, u0 and v0 are all intrinsic parameters of the vehicle-mounted camera and may be obtained by a known calibration tool. (u, v) is a pixel coordinate of a point in the original image, and (X, Y, Z) is a world coordinate of a point in the world coordinate system.

R is a rotation matrix between the world coordinate system and the camera coordinate system, and T is a translation matrix between the world coordinate system and the camera coordinate system. $\alpha$, $\beta$ and $\gamma$ are respectively the pitch angle, the yaw angle and the roll angle of the vehicle-mounted camera, h is a mounting height of the vehicle-mounted camera, and R and T may be respectively expressed as the following Equation (1) and Equation (2):

$$R = \begin{bmatrix} 1 & 0 & 0 \\ 0 & \cos\gamma & \sin\gamma \\ 0 & -\sin\gamma & \cos\gamma \end{bmatrix} \begin{bmatrix} \cos\alpha & 0 & -\sin\alpha \\ 0 & 1 & 0 \\ \sin\alpha & 0 & \cos\alpha \end{bmatrix} \begin{bmatrix} \cos\beta & 0 & -\sin\beta \\ 0 & \cos\beta & \sin\beta \\ 0 & 0 & 1 \end{bmatrix} \quad (1)$$

$$T = \begin{bmatrix} t_x \\ t_y \\ t_z \end{bmatrix} = \begin{bmatrix} 0 \\ 0 \\ h \end{bmatrix} \quad (2)$$

According to above principles, the first IPM image corresponding to ROI may be obtained according to the current pitch angle, the initial yaw angle of the vehicle-mounted camera. An example of the first IPM image corresponding to the above mentioned ROI may be referred to FIG. 3B.

Step 220: detecting whether the plurality of second lane lines in the intermediate first IPM image, which correspond to the first lane lines, are parallel to each other.

For example, detecting whether the plurality of second lane lines in the intermediate first IPM image are parallel to each other comprises determining the plurality of second lane lines in intermediate the first IPM image, which may exemplarily comprise the following steps S1-S3.

S1: obtaining a dark-light-dark (DLD) feature image by extracting a DLD feature from the intermediate first IPM image.

For example, a lane line feature is extracted from the first IPM image by performing DLD filtering on the intermediate first IPM image and then the DLD feature image is obtained based on the lane line feature.

For example, the lane line feature is expressed as: DLD (u, v)=max (min (src(u, v)−src(u−2, v), src(u, v)−src(u+2, v)), 0), and src(u, v) indicates a pixel value of a coordinate (u, v) in the first IPM image.

S2: obtaining a DLD binary image by performing a binarization process on the DLD feature image.

For example, the binarization process here may adopt but is not limited to a local threshold, that is, different regions in the DLD feature image may be binarized with different thresholds.

S3: determining the plurality of second lane lines by performing straight-line detection on the DLD binary image.

For example, the straight-line detection may be performed using methods such as the Hough Method, the LSD Method and the like in the embodiments of the present disclosure, to detect the second lane lines. Taking the first IPM image as illustrated in FIG. 3B for example, three second lane lines may be detected and are respectively L1, L2 and L3 in a sequence from left to right according to the locations of the lane lines.

In an example, detecting whether the plurality of second lane lines in the intermediate first IPM image are parallel to each other comprises: detecting whether angles of the plurality of second lane lines with respect to a same reference line in a same direction (a clockwise direction or a counter-clockwise direction) are identical, determining that the second lane lines are parallel to each other in a case where the angles of the plurality of second lane lines with respect to the same reference line in the same direction are identical, and determining that the second lane lines are not parallel to each other in a case where angles of any two of the plurality of second lane lines with respect to the same reference line in the same direction are not identical.

For example, referring to FIG. 3B, a horizontal line may be preset as a reference line and angles of the three second lane lines with respect to the reference line in the clockwise direction are respectively θ1, θ2 and θ3. If θ1, θ2 and θ3 are identical, the three second lane lines are determined to be parallel to each other; if any two angles are not identical, the three second lane lines are determined to be nonparallel to each other.

For example, as illustrated in FIG. 2, in a case where the plurality of second lane lines are nonparallel to each other, adjusting the pitch angle of the vehicle-mounted camera by detecting the relationship between the second lane lines in the intermediate first IPM image to obtain the final first IPM image further comprises Step 230: adjusting the current pitch angle and re-executing the above mentioned first set operation, until the second lane lines are parallel to each other.

In a case where the plurality of second lane lines are detected to be parallel to each other, the current pitch angle requires no adjustment and the process is over.

For example, adjusting the current pitch angle in the case where the plurality of second lane lines are not parallel to each other comprises: selecting any two nonparallel second lane lines from the plurality of second lane lines and determining a position of an intersection point of the two nonparallel second lane lines or extension lines thereof; reducing the current pitch angle by a first preset step in a case where the intersection point is in a start direction of the two second lane lines; and increasing the current pitch angle by a second preset step in a case where the intersection point is in an end direction of the two second lane lines. The first preset step may be same with or different from the second preset step.

Figure 4:
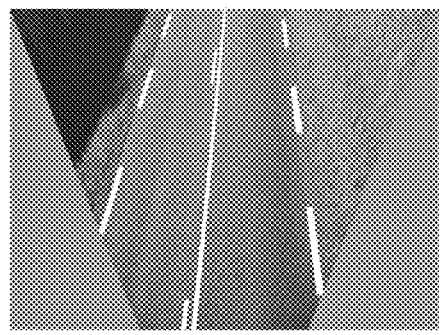
FIG. 4 is a schematic diagram of the first IPM image in case of a pitch angle which is too large.

Taking the IPM image as illustrated in FIG. 4, in the pixel coordinate system, the left top vertex is the origin, the downward direction is the positive v axis direction, and the right direction is the positive u axis direction. A direction of the lane line directing to the positive v axis direction is defined as the end direction of the lane line, and a direction of the lane line directing to the negative v axis direction is defined as the start direction of the lane line. As illustrated in FIG. 4, in a case where an intersection point of the three second lane lines is in a start direction of each lane line, that is, a gap between any two second lane lines of the three second lane lines is becoming larger in the positive v axis direction, the current pitch angle requires being reduced.

Figure 5:
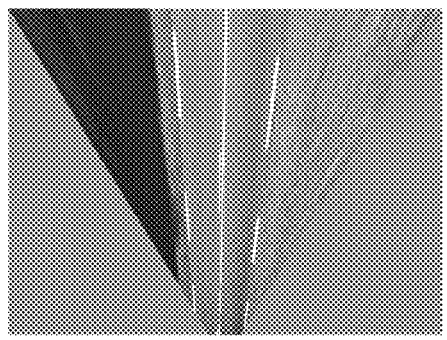
FIG. 5 is a schematic diagram of the first IPM image in case of a pitch angle which is too small.

Taking the IPM image as illustrated in FIG. 5, in a case where an intersection point of the three second lane lines is in the end direction of each lane line, that is, a gap between every two second lane lines of the three second lane lines is becoming smaller in the positive v axis direction, the current pitch angle requires being increased.

For example, the first preset step and the second preset step may be set as Δα, which is for example 0.001.

Step 140: adjusting a yaw angle of the vehicle-mounted camera by detecting an IPM binary image of a second IPM image corresponding to the ROI.

The second IPM image is determined based on an adjusted pitch angle and a current yaw angle. A binarization process is performed on the second IPM image to obtain the IPM binary image. The IPM binary image comprises a first pixel value region and a second pixel value region. For example, a pixel value of the first pixel value region is 1, and the first pixel value region is a white region; a pixel value of the second pixel value region is 0, and the second pixel value region is a black region. The second IPM image may indicate a second IPM occurring during a whole process of adjusting the yaw angle, for example, may be the final second IPM image and an intermediate second IPM image before the final second IPM image; accordingly, the IPM binary image may indicate a final IPM binary image or an intermediate IPM binary image.

Figure 7:
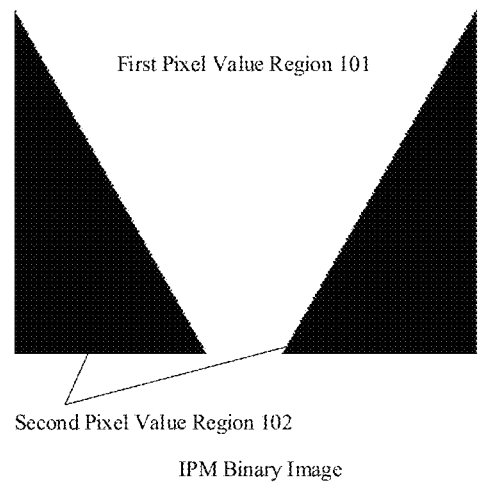
FIG. 7 is a schematic diagram of an IPM binary image in case of a right yaw angle.

FIG. 7 is an example of an IPM binary image corresponding to FIG. 3. As illustrated in FIG. 7, the ROI corresponds to the first pixel value region (the white region) 101.

In an example, adjusting the yaw angle of the vehicle-mounted camera by detecting the IPM binary image of the second IPM image comprises: adjusting the yaw angle of the vehicle-mounted camera to obtain a final IPM binary image, in which a boundary line between a first pixel value region 101 and a second pixel value region 102 is two straight lines. FIG. 7 illustrates the final IPM binary image after the yaw angle is adjusted. In FIG. 7, the boundary line between the first pixel value region 101 and the second pixel value region 102 are two straight lines which are respectively hypotenuses of two right triangles.

Figure 6:
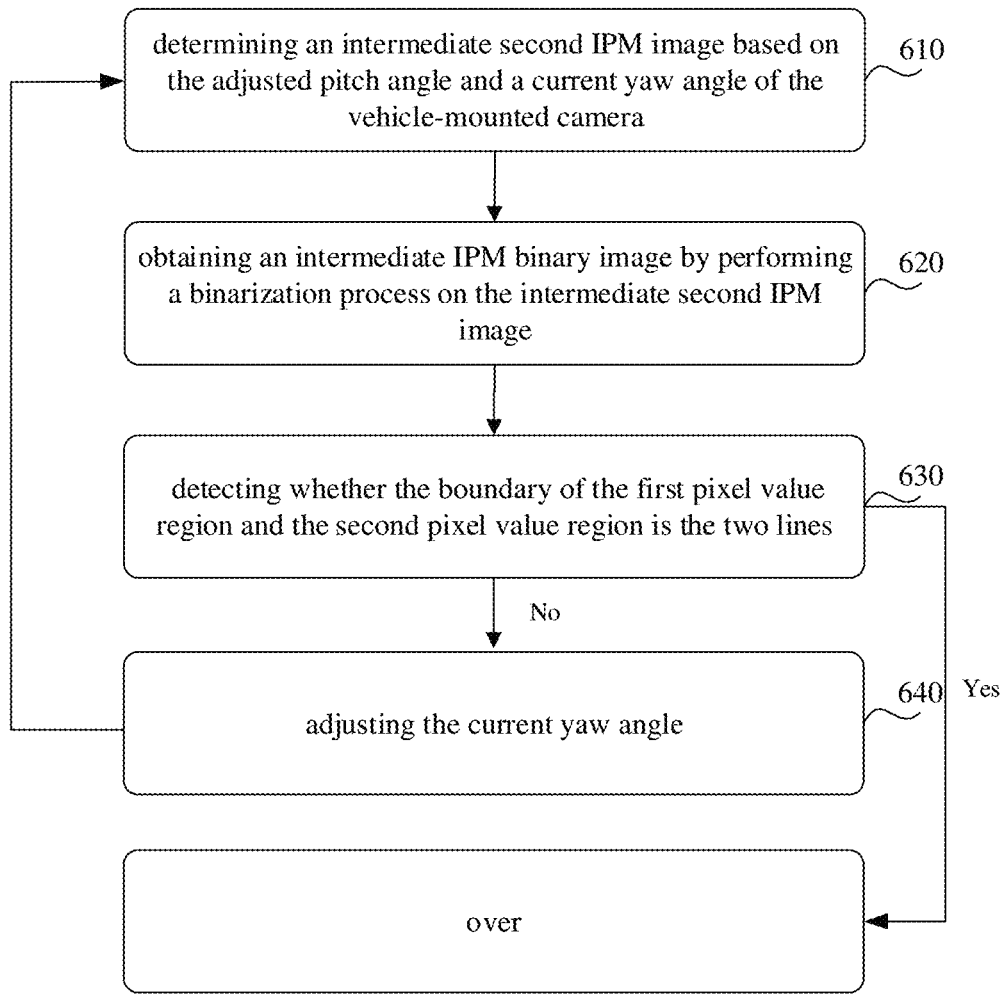
FIG. 6 is a schematic flowchart of an adjustment method of a yaw angle of a vehicle-mounted camera provided by some embodiments of the present disclosure.

For example, adjusting the yaw angle of the vehicle-mounted camera to obtain the final IPM binary image comprises executing a second set operation, and the second set operation may comprise following steps 610-630, as illustrated in FIG. 6.

Step 610: determining an intermediate second IPM image based on the adjusted pitch angle and a current yaw angle of the vehicle-mounted camera.

The adjusted pitch angle is the pitch angle of the camera after the above pitch angle adjustment is performed. If the second set operation is executed for a first time, the current yaw angle is the initial angle; if it is not the first time the second set operation is executed, the current yaw angle is an adjusted yaw angle after the last second set operation is executed.

Step 620: obtaining an intermediate IPM binary image by performing a binarization process on the intermediate second IPM image.

While performing the binarization process on the intermediate second IPM image, the intermediate second IPM image is compared to the ROI of the original image, so that a pixel value of a region in the second IMP image corresponding to the ROI is set to be 1; and a pixel value of a region in the second IMP image which does not correspond to the ROI is set to be 0.

Step 630: detecting whether the boundary line between the first pixel value region and the second pixel value region is two straight lines.

For example, in a case where the boundary line between the first pixel value region and the second pixel value region is not two straight lines, adjusting the yaw angle of the vehicle-mounted camera to obtain the final IMP binary image further comprises Step 640: adjusting the current yaw angle and re-executing the second set operation, until the boundary line between the first pixel value region and the second pixel value region is two straight lines and the final IPM binary image is obtained.

In a case where the boundary lines of the first pixel value region and the second pixel value region is two straight lines, the yaw angle requires no adjustment and the process is over. For example, as illustrated in FIG. 7, the boundary lines between the first pixel value region and the second pixel value region only comprises two straight lines which respectively passes through a left top vertex (0, 0) and a right top vertex (w, 0) of the IPM binary image, the current yaw angle requires no adjustment and the process is over, w is a pixel number in a width direction of the IPM binary image.

For example, in a case where the boundary line between the first pixel value region and the second pixel value region in the intermediate IPM binary image comprises more than two straight lines, positions of the more than two straight lines are detected. The current yaw angle is reduced by a third preset step in a case where any two of the more than two straight lines pass through a top left vertex of the intermediate IPM binary image, and the current yaw angle is increased by a fourth preset step in a case where any two of the more than two straight lines pass through a top right vertex of the intermediate IPM binary image. The third preset step and the fourth preset step may be same or different.

Figure 8:
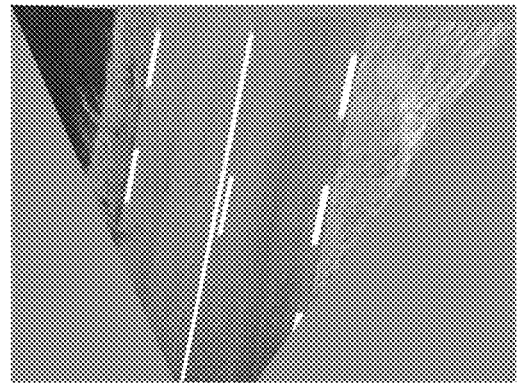
FIG. 8 is a schematic diagram of a second IPM image in case of a yaw angle which is too large.
Figure 9:
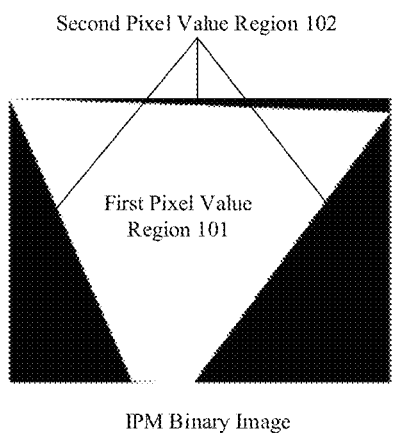
FIG. 9 is a schematic diagram of an IPM binary image in case of a yaw angle which is too large.

FIG. 8 and FIG. 9 respectively exemplarily illustrate a second IPM image and an IPM binary image corresponding to a yaw angle which is too large. More than two straight lines are detected in FIG. 9 and two of the straight lines pass through (0, 0), so the current yaw angle requires being decreased.

Figure 10:
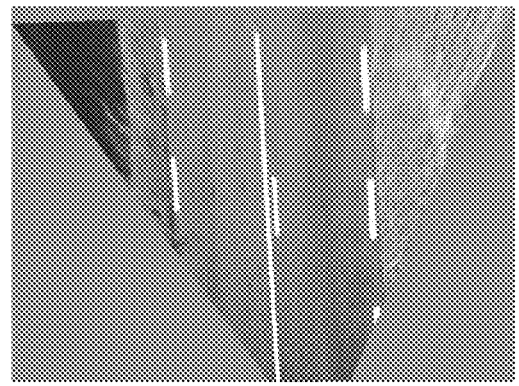
FIG. 10 is a schematic diagram of a second IPM image in case of a yaw angle which is too small.
Figure 11:
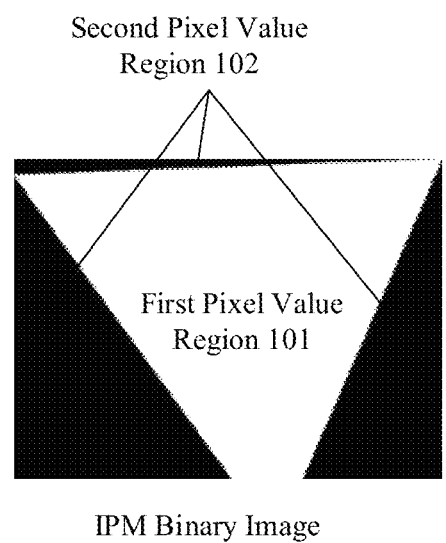
FIG. 11 is a schematic diagram of an IPM binary image in case of a yaw angle which is too small.

FIG. 10 and FIG. 11 respectively exemplarily illustrate a second IPM image and an IPM binary image corresponding to a yaw angle which is too small. More than two straight lines are detected in FIG. 9 and two of the straight lines pass through (w, 0), so the current yaw angle requires being increased.

For example, the third preset step and the fourth preset step may be set as $\Delta\beta$ which is for example 0.001.

According to the calibration method of a vehicle-mounted camera provided by the embodiments of the present disclosure, an original image comprising first lane lines and captured by the vehicle-mounted camera is obtained, a region of interest (ROI) comprising the first lane lines in the original image is determined, a pitch angle of the vehicle-mounted camera is adjusted by detecting second lane lines in an IPM image corresponding to the ROI, and a yaw angle of the vehicle-mounted camera is adjusted by detecting an amount of straight lines in an IPM binary image of a second IPM image corresponding to the ROI. In this technical solution, an automatic calibration of a vehicle-mounted camera may be accomplished as long as the ADAS system is mounted to the vehicle. The process is simple and convenient, the stability is high and the user experience is effectively improved.

Figure 12:
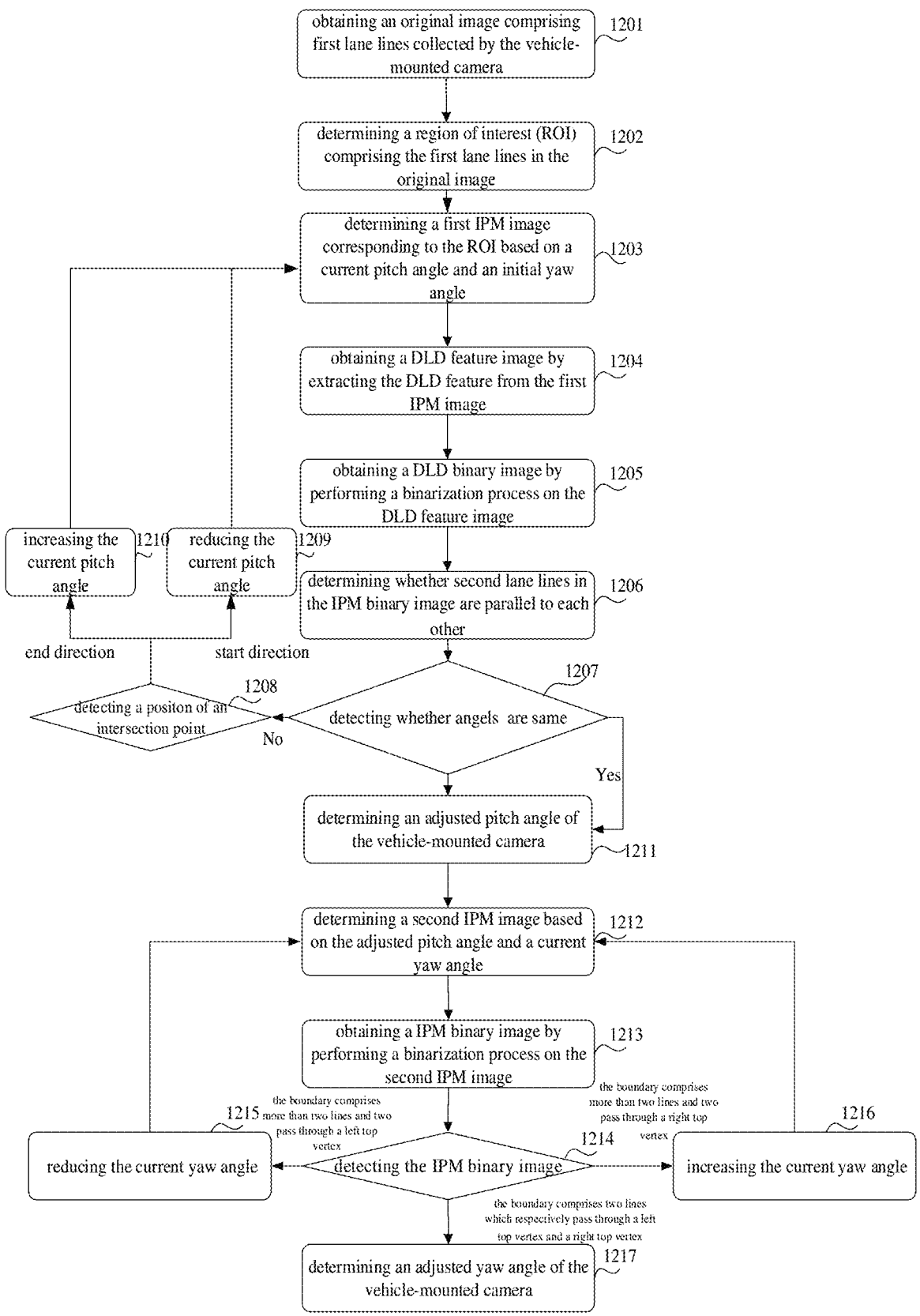
FIG. 12 is a schematic flowchart of a calibration method of a vehicle-mounted camera provided by some other embodiments of the present disclosure.

FIG. 12 is a schematic flowchart of a calibration method of a vehicle-mounted camera provided by some other embodiments of the present disclosure, and the calibration method comprises following steps.

Step 1201: obtaining an original image comprising a plurality of first lane lines and captured by the vehicle-mounted camera.

Step 1202: determining in the original image a region of interest (ROI) comprising the plurality of first lane lines.

Step 1203: determining, based on a current pitch angle and an initial yaw angle, a first IPM image corresponding to the ROI. In a case where the step 1203 is executed for the first time, the current pitch angle is an initial pitch angle; in a case it is not the first time the step 1203 is executed, the current pitch angle is an adjusted pitch angle obtained by Step 1209 or Step 1210.

Step 1204: obtaining a DLD feature image by extracting a DLD feature from the first IPM image.

Step 1205: obtaining a DLD binary image by performing a binarization process on the DLD feature image.

Step 1206: determining whether a plurality of second lane lines in the IPM binary image are parallel to each other by performing straight-line detection on the DLD binary image. The plurality of second lane lines correspond to the plurality of first lane lines and are obtained by performing an IPM conversion on the first lane lines.

Step 1207: detecting whether angles of the plurality of second lane lines with respect to a same reference line in a same direction (a clockwise direction or a counter-clockwise direction) are identical. If the angles are identical, Step 1211 is executed; if any two angles are not identical, Step 1208 is executed.

Step 1208: detecting a position of an intersection point of the plurality of second lane lines or extension lines thereof. In a case where the intersection point is in a start direction of the second lane lines, Step 1209 is executed; in a case where the intersection point is in an end direction of the second lane lines, Step 1210 is executed.

Step 1209: reducing the current pitch angle and returning to Step 1203.

Step 1210: increasing the current pitch angle and returning to Step 1203.

Step 1211: determining an adjusted pitch angle of the vehicle-mounted camera.

Step 1212: determining a second IPM image based on the adjusted pitch angle and a current yaw angle. In a case where Step 1212 is executed for the first time, the current yaw angle is the initial angle; in a case where it is not the first time Step 1212 is executed, the current yaw angle is an adjusted yaw angle obtained by Step 1215 or Step 1216.

Step 1213: obtaining an IPM binary image by performing a binarization process on the second IPM image.

Step 1214: performing straight-line detection on the IPM binary image to detect straight lines comprised by boundary lines between a first pixel value region and a second pixel value region of the IPM binary image. In case of detecting that the boundary lines comprises more than two straight lines and two of the straight lines pass through a left top vertex of the IPM binary image, Step 1215 is executed; in case of detecting that the boundary lines comprise more than two straight lines and two of the straight lines pass through a right top vertex of the IPM binary image, Step 1216 is executed; and in case of detecting that an amount of straight lines comprised by the boundary lines between the first pixel value region and the second pixel value region of the IPM binary image are two and the two straight lines respectively pass through a left top vertex and a right top vertex, Step 1217 is executed.

Step 1215: reducing the current yaw angle and returning to Step 1212.

Step 1216: increasing the current yaw angle and returning to Step 1212.

Step 1217: determining an adjusted yaw angle of the vehicle-mounted camera.

It should be noted that although a specific sequence of the operations in the calibration method provided by the embodiments of the present disclosure is described in the drawings, it is not required or implied that these operations are implemented in the specific sequence, or all the operations must be implemented in order to achieve a required result. Instead, an implementation sequence described in the flowchart may be changed. Additionally or alternatively, some steps may be omitted and some steps may be merged into one step for implementation, and/or one step may be broken into steps for implementation.

Figure 13:
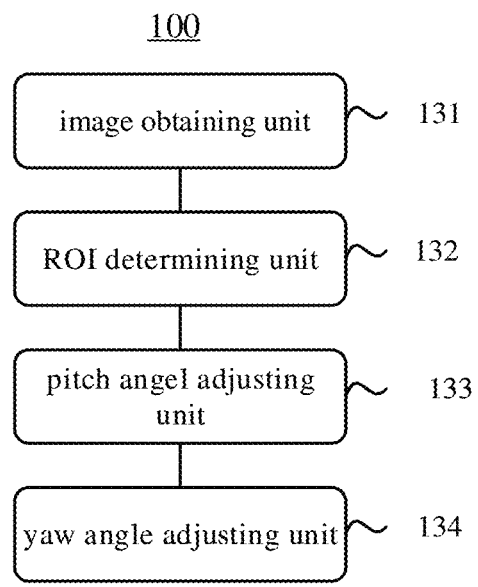
FIG. 13 is a schematic structural diagram of a calibration device configured for a vehicle-mounted camera provided by some embodiments of the present disclosure.

Based on a single invention concept, embodiments of the present disclosure further provide a calibration device. FIG. 13 is a schematic block diagram of a calibration device 100 configured for a vehicle-mounted camera provided by embodiments of the present disclosure and the calibration device 100 comprises: an image obtaining unit 131, configured to obtain an original image comprising a plurality of first lane lines and captured by the vehicle-mounted camera; a region of interest (ROI) determining unit 132, configured to determine a region of interest (ROI) comprising the plurality of first lane lines in the original image; a pitch angle adjusting unit 133, configured to adjust a pitch angle of the vehicle-mounted camera by detecting a plurality of second lane lines in a first inverse perspective mapping (IPM) image corresponding to the ROI, the second lane lines corresponding to the first lane lines; and a yaw angle adjusting unit 134, configured to adjust a yaw angle of the vehicle-mounted camera by detecting an IPM binary image of a second IPM image corresponding to the ROI.

For example, the pitch angle adjusting unit 133 is configured to adjust the pitch angle of the vehicle-mounted camera by detecting a relationship between the plurality of second lane lines in the first IPM image to obtain a final first IPM image in which a plurality of second lane lines are parallel to each other, and the plurality of second lane lines correspond to the first lane lines.

For example, the pitch angle adjusting unit 133 is configured to execute a first set operation comprising: determining an intermediate first IPM image based on a current pitch angle and an initial yaw angle of the vehicle-mounted camera; and detecting whether a plurality of second lane lines in the intermediate first IPM image are parallel to each other, the plurality of second lane lines in the intermediate first IPM image corresponding to the first lane lines.

The pitch angle adjusting unit 133 is further configured to adjust the current pitch angle and re-execute the above first set operation in a case where any two of the plurality of second lane lines are not parallel to each other, until the plurality of second lane lines are parallel to each other and the final first IPM image is obtained.

In an example, detecting whether the plurality of second lane lines in the intermediate first IPM image are parallel to each other comprises: detecting whether angles of the plurality of second lane lines with respect to a same reference line in a same direction are identical, determining that the plurality of second lane lines are parallel to each other in a case where the angles of the plurality of second lane lines with respect to the same reference line in the same direction are identical, and determining that the plurality of second lane lines are not parallel to each other in a case where angles of any two of the plurality of second lane lines with respect to the same reference line in the same direction are not identical.

For example, in a case where the pitch angle adjusting unit 133 executes detecting whether angles of the plurality of second lane lines with respect to the same reference line in the same direction are identical, the pitch angle adjusting unit 133 is configured to: obtain a dark-light-dark (DLD) feature image by extracting a DLD feature from the first IPM image, obtain a DLD binary image by performing a binarization process on the DLD feature image, and determine the plurality of second lane lines by performing straight-line detection on the DLD binary image.

For example, in a case where the pitch angle adjusting unit 133 executes obtaining the DLD feature image by extracting the DLD feature from the first IPM image, the pitch angle adjusting unit 133 is configured to: extract a lane line feature from the first IPM image by performing DLD filtering on the first IPM image; and obtain the DLD feature image based on the lane line feature. The lane line feature is expressed as: DLD (u, v)=max (min (src(u, v)−src(u−2, v), src(u, v)−src(u+2, v)), 0), and src(u, v) indicates a pixel value of a coordinate (u, v) in the first IPM image.

For example, in a case where the pitch angle adjusting unit 133 executes adjusting the current pitch angle in a case where any two of the second lane lines are not parallel to each other, the pitch angle adjusting unit 133 is configured to: select any two nonparallel second lane lines from the plurality of second lane lines and detect a position of an intersection point of the two nonparallel second lane lines or extension lines thereof; reduce the current pitch angle by a first preset step in a case where the intersection point is in a start direction of the two second lane lines; and increase the current pitch angle by a second preset step in a case where the intersection point is in an end direction of the two second lane lines. The first preset step and the second preset step may be same or different.

For example, the IPM binary image comprises a first pixel value region and a second pixel value region, the ROI corresponds to the first pixel value region. For example, the yaw angle adjusting unit 134 is configured to adjust the yaw angle of the vehicle-mounted camera to obtain a final IPM binary image of a final second IPM image, and in the final IPM binary image, a boundary lines between the first pixel value region and the second pixel value region is two straight lines.

In some examples, the yaw angle adjusting unit 134 is configured to execute a second set operation comprising: determining an intermediate second IPM image based on an adjusted pitch angle and a current yaw angle of the vehicle-mounted camera; obtaining an intermediate IPM binary image by performing a binarization process on the intermediate second IPM image; and detecting whether the boundary line between the first pixel value region and the second pixel value region are two straight lines.

The yaw angle adjusting unit 134 is further configured to adjust the current yaw angle and re-execute the second set operation in a case where the boundary lines between the first pixel value region and the second pixel value region are not two straight lines, until the boundary line of the first pixel value region and the second pixel value region is two straight lines and the final IPM binary image is obtained.

If the second set operation is executed for the first time, the current yaw angle is the initial angle; if it is not the first time the second set operation is executed, the current yaw angle is an adjusted yaw angle after the last second set operation is executed.

For example, as illustrated in FIG. 7, the boundary lines between the first pixel value region and the second pixel value region only comprise two lines which respectively passes through a left top vertex and a right top vertex of the intermediate IPM binary image, the current yaw angle requires no adjustment and the process is over. In this situation, the intermediate IPM binary image is the final IPM binary image.

For example, in a case where the yaw angle adjusting unit 134 executes adjusting the current yaw angle in a case where the boundary lines between the first pixel value region and the second pixel value region in the intermediate IPM binary image are not two straight lines, the yaw angle adjusting unit 134 is configured to: detect positions of the straight lines in the IPM binary image, in a case where the boundary lines between the first pixel value region and the second pixel value region in the intermediate IPM binary image are not two straight lines; reduce the current yaw angle by a third preset step in a case where any two straight lines in the intermediate IPM binary image pass through the top left vertex of the intermediate IPM binary image; and increase the current yaw angle by a fourth preset step in a case where any two straight lines in the intermediate IPM binary image pass through the top right vertex of the intermediate IPM binary image. The third preset step and the fourth preset step may be same or different.

It should be understood that the sub-systems or units in the device correspond to steps in the method as described with reference to FIGS. 1-12. Thus, the operations and features described with reference to the above method also apply to the device and the units of the device, which are not repeated here.

All units in the embodiments of the present disclosure may be realized in software, hardware, firmware, etc. For example, in a case at least some units adopt a software module, the software module may be realized through a central processing unit (CPU) or other forms of processing units which have data processing capacities and/or instruction execution capabilities.

Figure 14:
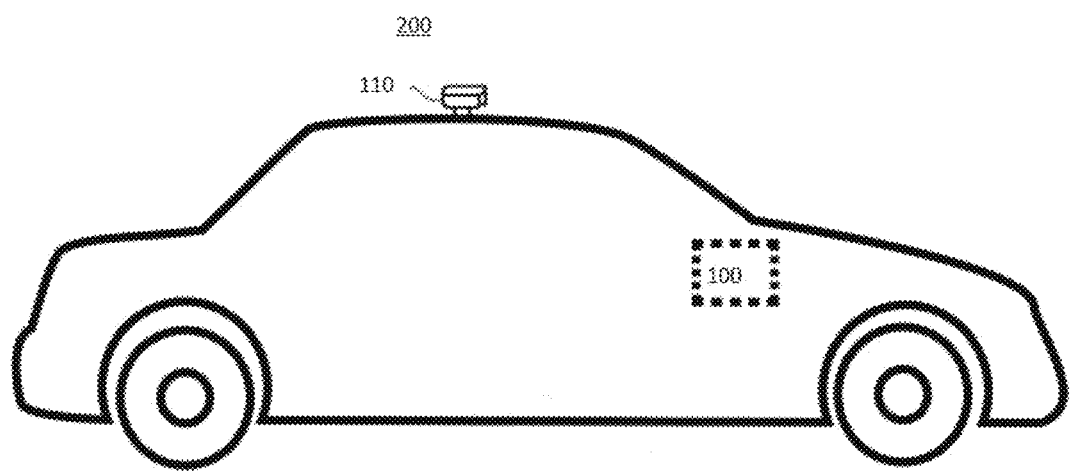
FIG. 14 is a schematic diagram of a vehicle provided by some embodiments of the present disclosure.

Embodiments of the present disclosure further provide a vehicle. As illustrated in FIG. 14, the vehicle 200 comprises a vehicle-mounted camera 110 and the above calibration device 100, the vehicle-mounted camera 110 is configured for obtaining an original image comprising lane lines of a road and transmitting the original image to the calibration device 100, and the calibration device 100 is configured for calibrating the vehicle-mounted camera 110.

For example, as illustrated in FIG. 14, the calibration device 100 is mounted on a roof of the vehicle 200, and the vehicle-mounted camera 110 is mounted to a front windshield of the vehicle 200. In another example, the calibration device 100 and the vehicle-mounted camera 110 may be both mounted to the front windshield of the vehicle 200. For example, the vehicle-mounted camera 110 may be a monocular camera, a binocular camera, etc.

Figure 15:
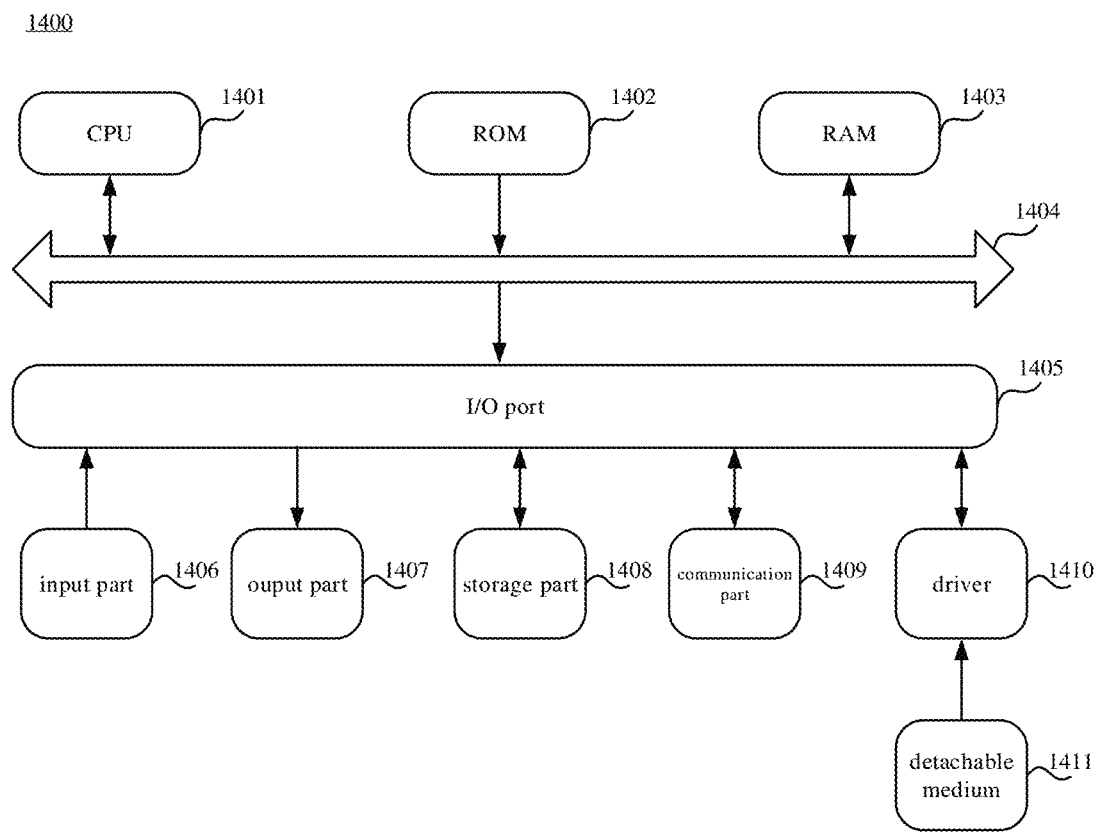
FIG. 15 is a schematic structural diagram of a computer device configured for realizing the embodiments of the present disclosure.

Based on a single invention concept, embodiments of the present disclosure further provide a computer device configured for realizing the calibration method provided by embodiments of the present disclosure. FIG. 15 is a schematic diagram of the computer device 1400 adapted to implement the calibration method provided by embodiments of the present disclosure.

As illustrated in FIG. 15, the computer device 1400 comprises a central processing unit (CPU) 1401 which may execute various appropriate actions and processes according to programs stored in a read only memory (ROM) 1402 or programs loaded from a storage part 1408 to a random access memory (RAM) 1403. The RAM 1403 further store various programs and data required by operations of the computer device 1400. The CPU 1401, the ROM 1402 and the RAM 1403 are interconnected through a bus 1404. An input/output (I/O) interface 1405 is also connected to the bus 1404.

Following parts are connected to the I/O interface 1405: an input part 1406 comprising a keyboard, a mouse, etc.; an output part 1407 comprising a cathode-ray tube (CRT), a liquid crystal display (LCD), a speaker, etc.; a storage part 1408 comprising a hard disk, etc.; and a communication part 1409 comprising a network interface card such as a local area network card and a modem. The communication part 1409 executes a communication process through a network such as the internet. A driver 1410 may be also connected to the I/O interface 1405 as required. A removable medium 1411 such as a magnetic disk, an optical disk, a magneto-optical disk and a semiconductor memory, may be installed on the driver 1410, to facilitate the retrieval of programs read from the removable medium 1411 and the installation thereof on the storage part 1408 as required.

In particular, according to embodiments of the present disclosure, the process described in the above FIGS. 1-12 may be implemented in computer software programs. For example, embodiments of the present disclosure provide a computer program product comprising computer program tangibly embedded in a computer readable medium, and the computer program comprises program codes configured for implementing the method as described in FIG. 1-12. In these embodiments, the computer program may be downloaded from the network and installed via the communication part 1409, and/or installed from the removable medium 1411.

The flowcharts and block diagrams in the figures illustrate architectures, functions and operations that may be implemented according to the system, the method and the computer program product of the various embodiments of the present invention. In this regard, each block in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. It should also be noted that, each block in the block diagrams and/or the flow charts and/or a combination of the blocks may be implemented by a dedicated hardware-based system executing specific functions or operations, or by a combination of a dedicated hardware and computer instructions.

Embodiments of the present disclosure further provide a computer readable storage medium, and the computer readable storage medium may be a computer readable storage medium included in the device of the above embodiments, or a stand-alone computer readable storage medium which is not installed in the device. The computer readable storage medium may store one or more programs, and the programs are executed by one or more processors to execute the above calibration method provided by the embodiments of the present disclosure.

In an example, in a case where the computer-readable instructions are executed by a computer, a following method is executed: obtaining an original image comprising a plurality of first lane lines and captured by the vehicle-mounted camera; determining a region of interest (ROI) comprising the plurality of first lane lines in the original image; detecting a plurality of second lane lines in a first inverse perspective mapping (IPM) image corresponding to the ROI to adjust a pitch angle of the vehicle-mounted camera, the second lane lines corresponding to the first lane lines; and detecting an IPM binary image of a second IPM image corresponding to the ROI to adjust a yaw angle of the vehicle-mounted camera.

The foregoing merely are exemplary embodiments of the present disclosure, and not intended to define the scope of the present disclosure, and the scope of the present disclosure is determined by the appended claims.

What is claimed is:

1. A calibration method for automatically calibrating a vehicle-mounted camera, comprising:
obtaining an original image comprising a plurality of first lane lines and captured by the vehicle-mounted camera;
determining in the original image a region of interest (ROI) comprising the plurality of first lane lines;
adjusting a pitch angle of the vehicle-mounted camera by detecting a plurality of second lane lines in a first inverse perspective mapping (IPM) image corresponding to the ROI, the plurality of second lane lines corresponding to the plurality of first lane lines; and
adjusting a yaw angle of the vehicle-mounted camera by detecting an IPM binary image of a second IPM image corresponding to the ROI,
wherein the adjusting the pitch angle of the vehicle-mounted camera by detecting the plurality of second lane lines in the first IPM image comprises:
adjusting the pitch angle of the vehicle-mounted camera by detecting a relationship between the plurality of second lane lines in the first IPM image, to obtain a final first IPM image wherein a plurality of second lane lines in the final first IPM image are parallel to each other and correspond to the plurality of first lane lines;
the adjusting the pitch angle of the vehicle-mounted camera by detecting the relationship between the plurality of second lane lines in the first IPM image to obtain the final first IPM image comprises:
executing a first set operation, wherein the first set operation comprises: determining an intermediate first IPM image based on the current pitch angle and an initial yaw angle of the vehicle-mounted camera, and detecting whether a plurality of second lane lines in the intermediate first IPM image are parallel to each other, wherein the plurality of second lane lines in the intermediate first IPM image correspond to the plurality of first lane lines;
adjusting the current pitch angle and re-executing the first set operation, in a case where the plurality of second lane lines in the intermediate first IPM image are not parallel to each other, until the plurality of second lane lines in the intermediate first IPM image are parallel to each other and the final first IPM image is obtained,
wherein the intermediate first IPM image comprises a DLD feature, and the detecting whether the plurality of second lane lines in the intermediate first IPM image are parallel to each other comprises:
determining the plurality of second lane lines in the intermediate first IPM image, and further the determining the plurality of second lane lines in the intermediate first IPM image comprises:
obtaining a dark-light-dark (DLD) feature image by extracting the DLD feature from the intermediate first IPM image;
obtaining a DLD binary image by performing a binarization process on the DLD feature image; and
determining the plurality of second lane lines in the intermediate IPM image by performing straight-line detection on the DLD binary image.

2. The calibration method according to claim 1, wherein the detecting whether the plurality of second lane lines in the intermediate first IPM image are parallel to each other further comprises:
detecting whether angles of the plurality of second lane lines in the intermediate first IPM image with respect to a same reference line in a same direction are identical;
determining that the plurality of second lane lines in the intermediate first IPM image are parallel to each other in a case where the angles of the plurality of second lane lines in the intermediate first IPM image with respect to the same reference line in the same direction are identical; and
determining that the plurality of second lane lines in the intermediate first IPM image are not parallel to each other in a case where angles of any two of the plurality of second lane lines in the intermediate first IPM image with respect to the same reference line in the same direction are not identical.

3. The calibration method according to claim 1, wherein the obtaining the DLD feature image by extracting the DLD feature from the intermediate first IPM image comprises:
extracting a lane line feature from the intermediate first IPM image by performing DLD filtering on the intermediate first IPM image, wherein the lane line feature is expressed as:

$$DLD(u,v)=\max(\min(src(u,v)-src(u-2,v),src(u,v)-src(u+2,v)),0),$$

where src(u, v) indicates a pixel value of a coordinate (u, v) in the intermediate first IPM image; and
obtaining the DLD feature image based on the lane line feature.

4. The calibration method according to claim 1, wherein the adjusting the current pitch angle in the case where the plurality of second lane lines in the intermediate first IPM image are not parallel to each other comprises:
  selecting any two nonparallel second lane lines from the plurality of second lane lines in the intermediate first IPM image and detecting a position of an intersection point of the two nonparallel second lane lines or of extension lines of the two nonparallel second lane lines;
  reducing the current pitch angle by a first preset step in a case where the intersection point is in a start direction of the two nonparallel second lane lines; and
  increasing the current pitch angle by a second preset step in a case where the intersection point is in an end direction of the two nonparallel second lane lines.

5. A storage medium, storing a computer-readable instruction non-transitorily, which, when executed by a computer, causes the method according to claim 1 to be executed.

6. A calibration method for automatically calibrating a vehicle-mounted camera, comprising:
  obtaining an original image comprising a plurality of first lane lines and captured by the vehicle-mounted camera;
  determining in the original image a region of interest (ROI) comprising the plurality of first lane lines;
  adjusting a pitch angle of the vehicle-mounted camera by detecting a plurality of second lane lines in a first inverse perspective mapping (IPM) image corresponding to the ROI, the plurality of second lane lines corresponding to the plurality of first lane lines; and
  adjusting a yaw angle of the vehicle-mounted camera by detecting an IPM binary image of a second IPM image corresponding to the ROI, wherein the adjusting the yaw angle of the vehicle-mounted camera by detecting the IPM binary image of the second IPM image comprises:
  adjusting the yaw angle of the vehicle-mounted camera to obtain a final IPM binary image of a final second IPM image, wherein a boundary line between a first pixel value region and a second pixel value region in the final IPM binary image is two straight lines, and the first pixel value region in the final IPM binary image corresponds to the ROI,
    wherein the adjusting the yaw angle of the vehicle-mounted camera to obtain the final IPM binary image of the final second IPM image comprises:
    executing a first set operation, wherein the second set operation comprises: determining an intermediate second IPM image based on the adjusted pitch angle and the current yaw angle of the vehicle-mounted camera, obtaining an intermediate IPM binary image by performing a binarization process on the intermediate second IPM image, and detecting whether a boundary line between a first pixel value region and a second pixel value region in the intermediate IPM binary image is two straight lines, wherein the first pixel value region in the intermediate IPM binary image corresponds to the ROI; and
    adjusting the current yaw angle and re-executing the second set operation in a case where the boundary line between the first pixel value region and the second pixel value region in the intermediate IPM binary image is not the two straight lines, until the boundary line between the first pixel value region and the second pixel value region in the intermediate IPM binary image is the two straight lines and the final IPM binary image is obtained.

7. The calibration method according to claim 6, the adjusting the current yaw angle and re-executing the second set operation in a case where the boundary line between the first pixel value region and the second pixel value region in the intermediate IPM binary image is not the two straight lines comprises:
  detecting positions of straight lines in the intermediate IPM binary image, in a case where the boundary line between the first pixel value region and the second pixel value region in the intermediate IPM binary image comprises more than two straight lines;
  reducing the current yaw angle by a third preset step in a case where any two of the more than two straight lines pass through a top left vertex of the intermediate IPM binary image; and
  increasing the current yaw angle by a fourth preset step in a case where any two of the more than two straight lines pass through a top right vertex of the intermediate IPM binary image.

8. A calibration device of a vehicle-mounted camera, comprising:
  an image obtaining processor, configured to obtain an original image comprising a plurality of first lane lines and captured by the vehicle-mounted camera;
  a region of interest (ROI) determining processor, configured to determine a region of interest (ROI) comprising the plurality of first lane lines in the original image;
  a pitch angle adjusting processor, configured to adjust a pitch angle of the vehicle-mounted camera by detecting a plurality of second lane lines in a first inverse perspective mapping (IPM) image corresponding to the ROI, the plurality of second lane lines corresponding to the plurality of first lane lines; and
  a yaw angle adjusting processor, configured to adjust a yaw angle of the vehicle-mounted camera by detecting an IPM binary image of a second IPM image corresponding to the ROI,
  wherein the yaw angle adjusting processor is configured to adjust the yaw angle of the vehicle-mounted camera to obtain the final IPM binary image of the final second IPM image, wherein a boundary line of a first pixel value region and a second pixel value region in the final IPM binary image is two straight lines, and the first pixel value region in the final IPM binary image corresponds to the ROI,
    wherein the yaw angle adjusting processor is configured to execute a second set operation, wherein the second set operation comprises: determining an intermediate second IPM image based on the adjusted pitch angle and a current yaw angle of the vehicle-mounted camera, obtaining an intermediate IPM binary image by performing a binarization process on the intermediate second IPM image, and detecting whether a boundary line between a first pixel value region and a second pixel value region in the intermediate IPM binary image is the two straight lines, the first pixel value region in the intermediate IPM binary image corresponding to the ROI;
    the yaw angle adjusting processor is further configured to adjust the current yaw angle and re-execute the second set operation in a case where the boundary line between the first pixel value region and the second pixel value region in the intermediate IPM binary image is not the two straight lines, until the boundary line between the first pixel value region and the second pixel value region in the intermediate IPM binary image is the two straight lines and the final IPM binary image is obtained.

9. The device according to claim 8, wherein the pitch angle adjusting processor is configured to adjust the pitch angle of the vehicle-mounted camera by detecting a relationship between the plurality of second lane lines in the first IPM image, to obtain a final first IPM image, and the plurality of second lane lines in the final first IMP image are parallel to each other.

10. The device according to claim 9, wherein the pitch angle adjusting processor is configured to execute a first set operation, wherein the first set operation comprises: determining an intermediate first IPM image based on a current pitch angle and an initial yaw angle of the vehicle-mounted camera; and detecting whether the plurality of second lane lines in the intermediate first IPM image are parallel to each other, the plurality of second lane lines in the intermediate first IPM image corresponding to the plurality of first lane lines;

the pitch angle adjusting processor is further configured to adjust the current pitch angle and re-execute the first set operation in a case where any two of the plurality of second lane lines in the intermediate first IPM image are not parallel to each other, until the plurality of second lane lines in the intermediate first IPM image are parallel to each other and the final first IMP image is obtained.

11. The device according to claim 10, wherein the detecting whether the plurality of second lane lines in the intermediate first IPM image are parallel to each other comprises:

detecting whether angles of the plurality of second lane lines in the intermediate first IPM image with respect to a same reference line in a same direction are identical;

determining that the plurality of second lane lines are parallel to each other in a case where the angles of the plurality of second lane lines in the intermediate first IPM image with respect to the same reference line in the same direction are identical; and determining that the plurality of second lane lines are not parallel to each other in a case where angles of any two of the plurality of second lane lines in the intermediate first IPM image with respect to the same reference line in the same direction are not identical.

12. A vehicle, comprising a vehicle-mounted camera and the calibration device according to claim 8, wherein the calibration device is configured for calibrating the vehicle-mounted camera.

* * * * *